Jan. 13, 1959    E. J. HERBENAR    2,868,572
PLASTIC LINED BALL JOINT WITH INTEGRAL SEAL
Filed May 31, 1955
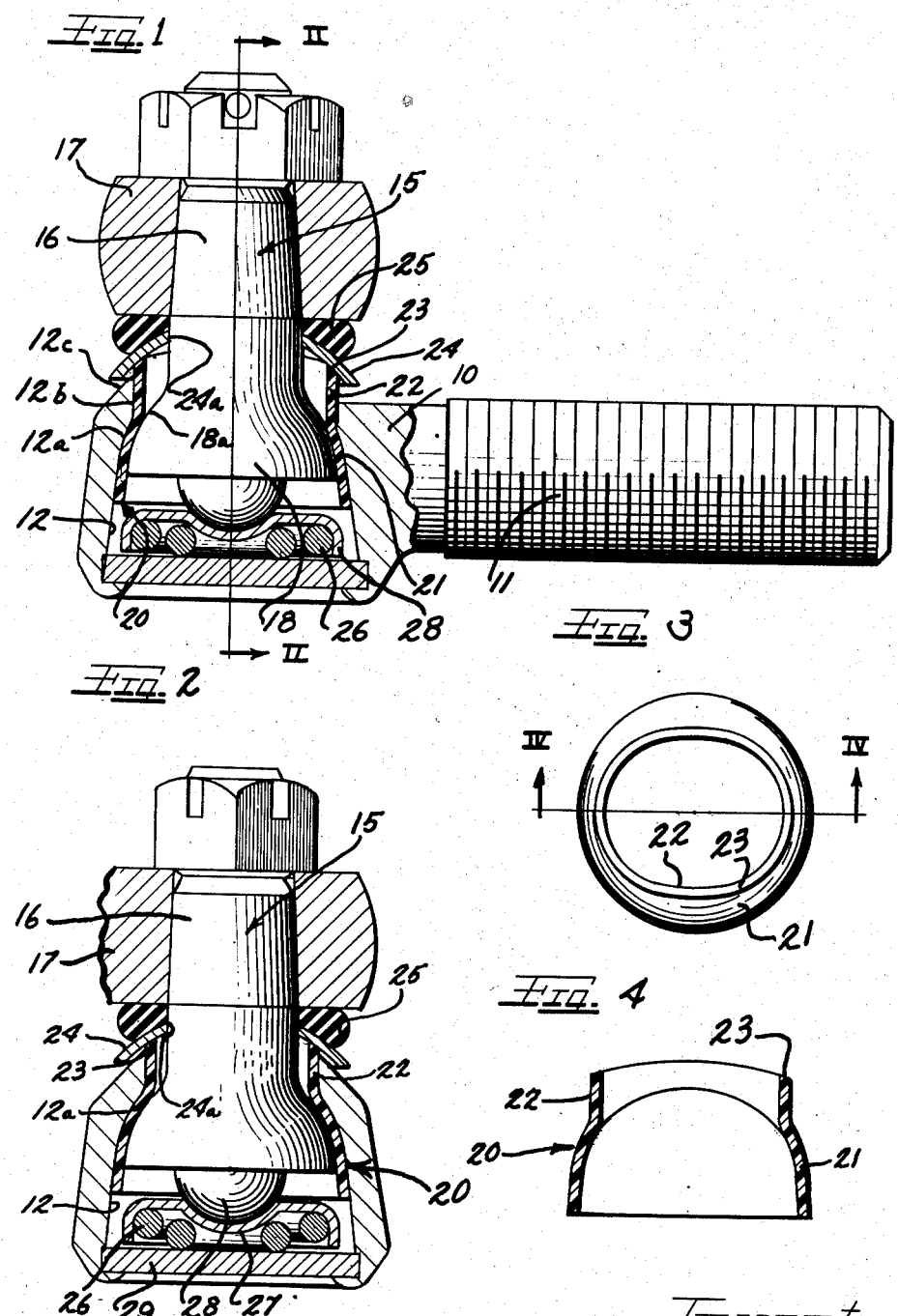
Inventor
EDWARD J. HERBENAR

United States Patent Office 2,868,572
Patented Jan. 13, 1959

2,868,572

PLASTIC LINED BALL JOINT WITH INTEGRAL SEAL

Edward J. Herbenar, Detroit, Mich., assignor to Thompson Products, Inc., Cleveland, Ohio, a corporation of Ohio Application May 31, 1955, Serial No. 511,963

2 Claims. (Cl. 287—90)

The present invention relates to an improvement in ball joint construction and, more particularly, is concerned with the provision of a novel and improved plastic lined ball joint wherein the plastic liner simultaneously provides a universal bearing surface for the joint parts and also provides a sealing surface for preventing the ingress of foreign matter to the joint bearing surfaces.

Ball joints of the type comprising a housing having a socket with a segmental spherical internal surface surrounding an aperture, and incorporating a ball stud passing through the aperture and having an enlarged head portion with a segmental spherical surface thereon complementing the segmental spherical surface of the socket, are well known in the joint art. Methods of improving the bearing relationship between the stud and the socket have been continually improved in recent years, spurred on in a great measure by the need for free moving joints of exceptional durability capable of withstanding the increasingly higher speeds of the modern day automotive vehicle. Unfortunately, the tendency has been for such improved, high efficiency, joints to incorporate expensive structural features such as hardened bearing surfaces, anti-friction ball bearings, and the like. In addition, it has been the constant desire of industry to provide a truly greased-for-life bearing in which no greasing whatever is required after initial assembly. This latter goal has been attempted in several ways including the utilization of complex and expensive seals designed to prevent the egress of grease from the assembled joint.

In accordance with the principles of the present invention, a novel and unusually efficient ball joint is provided for such uses as tie rods, drag links, pitman arms, and the like, wherein major simplifications have been achieved in the structure of the joint without any decrease in safety, and wherein a truly greased-for-life structure is provided without an expensive sealing structure.

In accordance with the present invention, a thin liner of self-lubricating plastic material is positioned between the ball stud and the housing socket in such a manner as to operate in a fixed position relative to the housing. Pivotal motions between the ball stud and the housing occur between the surface of the ball stud head and the internal surface of the plastic liner and accordingly the internal segmental spherical surface of the socket need not be finish machined to provide a bearing surface. It has been found that the cooperation between the stud head segmental spherical surface and the plastic liner produces an unusually efficient bearing surface which needs no grease subsequent to initial assembly at which time a break-in grease is provided within the ball joint socket. Efficient operation of the plastic liner bearing requires an absence of foreign material and since no provision is made for subsequent greasing to flush foreign matter from the joint, an unusually effective seal is necessary. In accordance with the principles of the present invention such a seal is simply and inexpensively formed as an integral part of the plastic lined joint.

A seal of the present invention is provided by an axially extending peripheral lip integral with the thin plastic liner and extending outwardly beyond the outer surface of the ball joint housing around the stud. This extending lip contacts a segmental spherical seal disk secured for movement with the stud. Preferably, this disk is also constructed of plastic and is in continual abutting engagement with the external edge of the extending lip and is wiped thereby during pivotal movement of the joint parts. Since all joint movement occurs inside of the bent plastic liner, dirt and other foreign contamination is prevented from entering the bearing surfaces of the joint by means of this simple, external, sealing relationship between the end of the liner and the segmental spherical disk.

It is therefore an object of the present invention to provide a novel and improved plastic lined ball joint having an inexpensive integral seal.

Still a further object of the present invention is to provide an improved plastic lined ball joint capable of operation throughout its life on an initial supply of grease.

Still a further object of the present invention is to provide a simplified ball joint and seal combination.

A feature of the invention is the utilization of a plastic liner as a bearing surface and also as a major component of the ball joint seal.

Another object of the present invention is to provide an effective greased-for-life bearing of unusually inexpensive yet highly efficient construction.

Still other and further objects and features of the present invention will at once become apparent to those skilled in the art from a consideration of the attached drawings wherein a preferred embodiment of the invention is shown by way of illustration only and, wherein:

Figure 1 is a side elevational view in partial cross-section constructed in accordance with the present invention;

Figure 2 is an end elevational view in cross-section taken along the line II—II of Figure 1;

Figure 3 is a plan view of a plastic liner utilized in accordance with the principles of the present invention; and Figure 4 is a side elevational view in cross-section taken along the line IV—IV of Figure 3.

As shown on the drawings:

As may be seen from a consideration of Figures 1 and 2, the joint of the present invention comprises a housing generally indicated at 10 having a threaded portion 11 for cooperation with a link member such as for example a tie rod or the like, and a socket portion 12. The socket portion 12 is provided with a segmental spherical bearing surface 12a and a aperture defined by a laterally extending edge surface 12b. A ball stud 15 having a tapered surface 16 for cooperation with a second link member such as for example a steering arm 17 is positioned in the socket 12. As may be seen from the figures, the stud 15 is provided with an enlarged head portion 18 having a segmental spherical outer surface 18a having an external diameter substantially greater than that of the aperture defining edge 12b of the socket 10.

A thin plastic liner 20 having a segmental spherical contour 21 is depressed into the socket 12 into conforming relationship with the segmental spherical internal surface 12a thereof. The internal surface of the liner is in turn in cooperable engagement with the external segmental spherical surface 18a of the stud 15 and provides an anti-friction bearing surface therewith. Preferably, in the interests of economy, and also to assure prevention of relative movement between the liner 20 and the socket 12, the internal surfaces of the socket 12 are left in a rough machined, or rough forged condition. Under such circumstances, the plastic liner 20 will be frictionally gripped by the slight irregularities in the surface of the socket 12 and, after the application of pressures forcing the stud into firm engagement with the liner, rotation between the liner and the socket is positively prevented.

The liner 20 is also provided with an extending peripheral lip portion, projecting substantially axially of the stud 15. This lip portion 22 extends beyond the outermost surface 12c of the housing 10 and is preferably beveled at its upper edge 23 for cooperation with the segmental spherical disk 24. The disk 24 is resiliently urged against the beveled edge 23 by means of a rubber member 25 or, alternatively, by a spring, not shown, the upper surface of which is confined by the bottom surface of the member 17.

The segmental spherical disk 24 may be, as illustrated, concentric about the axis of pivotal movement of the stud 15 thereby providing a smooth, constantly acting wiping cooperation between the beveled edge 23 of the liner 20 and the under surface of the disk 24. The disk 24 may, however, have a slightly different radius of curvature from the radius necessary to provide concentricity since the resilient rubber member 25 will maintain the disk 24 in peripheral contact with the edge 23. While such resiliency thus makes various curvatures of the disk 24, and in fact renders even a flat disk, operable nevertheless it will be apparent that the closer the center of curvature of the disk 24, necessary to provide concentricity, is to the pivotal axis of the stud the more near circular the aperture 24a through the disk 24 may be. Where the disk is concentric, the aperture 24a may be the same diameter as the stud 15, thereby providing a substantially perfect seal not only at the edge 23 but at the surface of the stud.

The joint illustrated in the drawings is one in which pivotal movement of the stud 15 in the plane defined by the longitudinal axis of the stud 15 and the housing portion 11 is greater than the amount of pivotal action permitted in the plane perpendicular thereto. Thus, the aperture 12b and the extended lip 22 of the liner 20 are elongated, or somewhat elliptical in configuration. It will be understood, however, that a circular aperture 12b, with the cooperating circular extending lip 22 may be utilized where desired.

In view of the relationship of the parts above discussed it will be apparent that a downward force is applied to the liner 20, relative to the stud 15, by the resilient member 25, thus urging the liner 23 into constant, snug, bearing cooperation with the segmental spherical surface 18a of the stud. At the same time, a spring 26 acts through an equalizing pressure blade 27 and the rounded protrusion 28 of the stud 15 to urge the stud 15 upwardly toward the segmental spherical internal surface 12a of the socket 12. Thus, the external segmental surface 21 of the liner 20 is biased firmly into contact with the internal surface 12a of the socket. Since the socket surface is preferably left slightly rough, the liner 20 is frictionally gripped by the socket and relative rotational movements take place between the stud surface 18a and the internal surface of the liner 20 while the liner 20 is retained against rotation relative to the socket by its frictional, wedging, contact therewith.

During initial assembly a conventional waterproof grease may be applied to the parts by placing such grease in the socket 12 prior to assembly of the bottom closure plate 29. This grease permits smooth bearing break in but is unnecessary to subsequent satisfactory operation of the joint and need not be replenished during the useful life of the joint. This useful life has been found to at least equal the useful life of the heretofore well known greased joints in spite of its substantially lesser cost.

It will thus be seen that I have provided a novel and greatly improved, permanently sealed and greased joint in which a plastic liner serves not only as a permanently greased bearing surface, or one which will operate satisfactorily without greasing, and also provides an unusually satisfactory sealing surface. In practice, it has been found that plastics of the self-lubricating types such as for example high molecular weight polyamides or polyethylene provide not only eminently satisfactory bearing surfaces but also sufficient inherent flexibility to provide highly satisfactory wiping action in combination with the sealing disk 24. The sealing disk 24 has likewise satisfactorily been manufactured of such plastics and when used in combination with a highly resilient backing member such as rubber at 25, the inherent flexibility provides an unusually efficient seal. It will be understood, however, that such metals as steel, aluminum, or other similar rigid materials may be utilized for the disk 24 if so desired.

It will be further understood, of course, that modifications and variations of the apparatus illustrated may be made without departing from the novel concepts of the present invention. Accordingly, it is my intention to limit the scope of the present invention solely as required by the hereinafter appended claims.

I claim as my invention:

1. A joint comprising a housing having a socket therein, a segmental spherical internally facing annular surface in said socket the inner edge of said annular surface defining an aperture, a stud extending into said socket through said aperture, an enlarged head on said stud having a segmental spherical bearing surface complementing said socket annular surface, means urging said stud head toward said socket annular surface, a thin plastic liner positioned between said segmental spherical surfaces and fixed relative to said socket and having an extended lip projecting through and beyond said aperture, an annular disk closely surrounding said stud externally of said housing and movable with said stud during tilting thereof and means urging said disk into sealing contact with said lip, said disk having a segmental spherical contour and being concentric with said segmental spherical surfaces and said lip having a beveled edge for surface contact with said segmental spherical disk, the external surface of said housing adjacent to the aperture being cut away to avoid contact with said disk during movement thereof with said stud.

2. A joint comprising a housing having a socket therein, a segmental spherical internally facing annular surface in said socket the inner edge of said annular surface defining an aperture, a stud extending into said socket through said aperture, an enlarged head on said stud having a segmental spherical bearing surface complementing said socket annular surface, means urging said stud head toward said socket annular surface, a thin plastic liner positioned between said segmental spherical surfaces and fixed relative to said socket and having an extended integral lip projecting through and beyond said aperture, said aperture and said lip having complementing non-circular walls, an annular disk closely surrounding said stud externally of said housing and movable with said stud during tilting thereof and means urging said disk into sealing contact with said lip, said disk having a segmental, spherical contour and said lip having a beveled edge for sealing contact with said disk, the external surface of said housing adjacent to the aperture being cut away to avoid contact with said disk during movement thereof with said stud.

References Cited in the file of this patent

UNITED STATES PATENTS

| | | |
|---|---|---|
| 2,301,346 | Venditty | Nov. 10, 1942 |
| 2,398,848 | Newey | Apr. 23, 1946 |
| 2,461,626 | Booth | Feb. 15, 1949 |
| 2,648,558 | Flumerfelt | Aug. 11, 1953 |

FOREIGN PATENTS

| | | |
|---|---|---|
| 1,013,151 | France | Apr. 30, 1952 |
| 1,091,445 | France | Oct. 27, 1954 |